United States Patent [19]
Greene

[11] Patent Number: 5,189,562
[45] Date of Patent: Feb. 23, 1993

[54] SYSTEM AND METHOD FOR COMBINING LANGUAGE TRANSLATION WITH ORIGINAL AUDIO ON VIDEO OR FILM SOUND TRACK

[76] Inventor: Leonard M. Greene, 6 Hickory La., Scarsdale, N.Y. 10503

[21] Appl. No.: 542,941

[22] Filed: Jun. 25, 1990

[51] Int. Cl.[5] ............................................. G11B 27/02
[52] U.S. Cl. ...................................... 360/13; 360/18; 358/143; 369/4; 369/86
[58] Field of Search ................... 360/13, 18, 8, 61, 55, 360/70; 369/4, 84, 1, 83, 86, 87; 358/143, 341, 343, 165, 84; 381/106, 107; 434/157, 159, 307, 308

[56] References Cited

U.S. PATENT DOCUMENTS

| | | | |
|---|---|---|---|
| 3,778,558 | 12/1973 | Wick et al. | 360/13 |
| 4,356,517 | 10/1982 | Ozaki et al. | 360/13 |
| 4,389,536 | 7/1983 | Schickedanz | 358/198 |
| 4,393,489 | 1/1983 | Mehrotra | 369/86 |
| 4,398,216 | 8/1983 | Field et al. | 358/84 |
| 4,445,149 | 4/1984 | Bluethgen | 360/13 |
| 4,453,809 | 6/1984 | Hill et al. | 360/13 X |
| 4,507,688 | 3/1985 | Fujiki et al. | 360/13 |
| 4,956,712 | 9/1990 | Hong | 358/198 |
| 5,099,365 | 3/1992 | Kang | 360/61 |

Primary Examiner—Andrew L. Sniezek
Attorney, Agent, or Firm—Edward A. Sokolski

[57] ABSTRACT

An original film or video sound track and a translation of this sound track into another language are separately recorded and a predetermined positioning timewise relative to the original sound track introduced to the output of the translation to make for best clarity and understanding of the two audio outputs when they are superimposed. The audio levels of the original sound track output and the translation are then set to predesired levels and combined with each other. The combined signal is then fed to an audio compressor which is triggered by an attack signal generated by a second recording of the translation which is advanced in time by 0.5-2.0 seconds relative to the first translation recording. The combined original and translation audio signal is thus ramped down to a lower level a predetermined time period before and during the time the translation audio is present, the sound track level being restored to its original audio level a predetermined time period after the translation audio has stopped. The combined audio signal is then recorded for use as the video or film sound track.

8 Claims, 1 Drawing Sheet

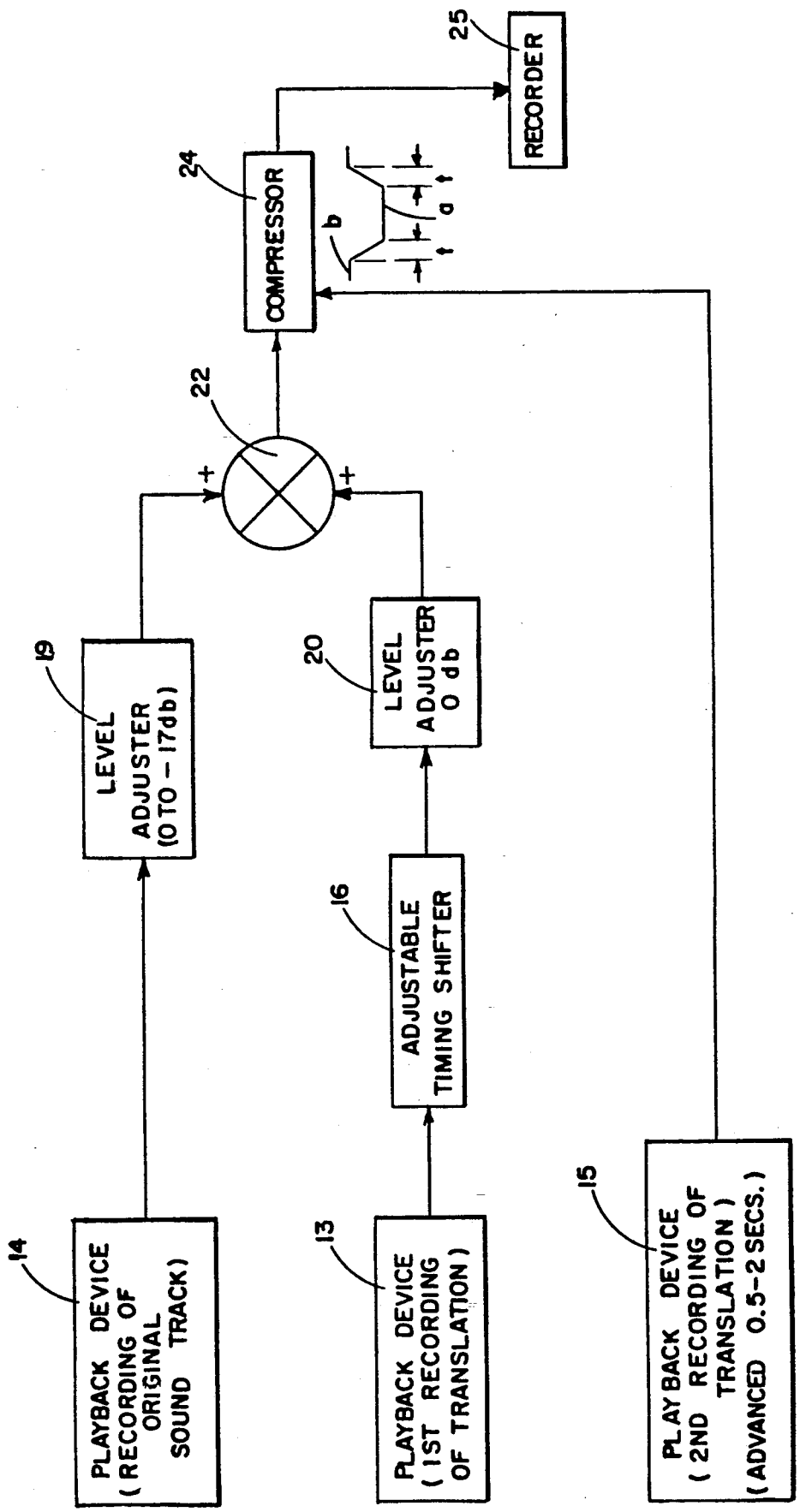

SYSTEM AND METHOD FOR COMBINING LANGUAGE TRANSLATION WITH ORIGINAL AUDIO ON VIDEO OR FILM SOUND TRACK

BACKGROUND OF THE INVENTION

1. Field of the Invention

This invention relates to the recording of audio on the sound tracks of video or film and more particularly for a system and method for combining a translation of the original audio into another language while maintaining such original audio at an audible level and with the translation properly positioned relative to the original audio.

2. Discussion of the Prior Art

Various techniques are used in the prior art for providing a translation of a video or film sound track into another language. The most common methods are dubbing, i.e. substituting audio in the second language for that of the original and the use of subtitles. In dubbing, the original speech of the actors is lost completely and along with it much of the flavor and drama of the production. The use of subtitles has the disadvantage of placing a strain on the viewer making the enjoyment of the production less than with dubbing. In some instances, particularly in the case of documentaries voice-over techniques are used in which a translator's or commentator's voice completely overrides that of the original audio for desired intervals. This has the disadvantage of dubbing in that for all intents and purposes it removes the original audio during such intervals. There are distinct advantages in keeping both the original and the translation in the sound track at high enough levels so that both can be understood. This not only enables persons who know only one language or the other to comprehend the audio, but also is an excellent tool for helping persons learn the other language by virtue of the instant translation provided.

It is therefore an object of this invention to enable the simultaneous inclusion in a video or film sound track of both the original audio and a translation thereof, both of which are audible.

Other objects of this invention will become apparent from the following description taken in connection with the accompanying drawing.

DESCRIPTION OF THE DRAWING

FIG. 1 is a functional block diagram of a preferred embodiment of the invention.

SUMMARY OF THE INVENTION

In the system of the invention, the original sound track of a video or film production and a translation of this sound track are separately recorded on a similar recording medium so that they both have the same basic characteristics. An adjustable timing shifter is initially set by an operator to position the translation recording to provide optimum synchronization between the original audio and video and its corresponding translation, so as to afford the best clarity and comprehension of the audio. Normally once set, the timing shifter or synchronizer is left in its initial position throughout the entire recording, but if need be, it can be readjusted.

All audio levels set forth in this summary and the detailed description of the invention are stated relative to National Association of Broadcasters broadcast level. The audio levels of the two sound outputs are then adjusted to bring the translation to National Association of Broadcasters broadcast level(0 db) and the original audio between 0 db and −17 db. The audio level of the original audio is ramped down to a level that is high enough to be audible yet low enough so a not to interfere with the translation. A preferred level for the original audio is about −5 db but may in certain instances be as low as −20 db. The two signals are then combined and fed to an audio compressor, the attack time of which is responsive to a second recording of the translation audio. This second recording is synchronized with the first recording of the translation so that it is advanced 0.5-2.0 seconds relative thereto. The second recording of the translation is inputted to the compressor and ramps down the level of the mixed recording while the translation is present to a level of between −5 and 20 db. In a preferred embodiment the second translation is advanced by about 0.5 seconds with the level of the mixed recording being ramped down to a level of about −5 db. Also, the translation audio level is set at a level of 0 db. The original language track output and any output from the recorded translation device which may be present is restored to its original level automatically in 0.5-2 seconds after the translation audio stops. It is to be noted that the signal is only ramped down in response to the advanced translation signal. Thus, when the translation signal is not present, the audio is at the level set for the original sound track. The sound track thus produced including both the original and the translation are recorded to provide a new sound track for the video or film production.

DETAILED DESCRIPTION OF THE INVENTION

Referring now to the sole FIGURE, a functional block diagram of a preferred embodiment of the invention is shown.

Playback device 14 which may comprise a computer disk or digital tape player has a recording installed therein which may comprise the original sound track of a video or film production. Installed in playback device 13 which is similar to playback device 14 is a recording of a specially prepared translation of the original sound track into another language and synchronized with the original sound track. A second recording of the translation of the original sound track but which is advanced in time by 0.5-2.0 seconds(preferably about 0.5 secs) is installed in playback device 15 which is similar to the first two playback devices. The output of playback device 13 which comprises a recording of the translation, is fed to adjustable timing shifter 16 which is set by an operator to provide optimum clarity and comprehension for the listener. The recorded translation which is the output of playback device 13 is thus positioned relative to the output of playback device 14 so that the two audio signals are separated from each other as best can be done to provide optimum comprehension. Each of the signals is then fed to a similar audio level adjuster 19 and 20 respectively. Level adjuster 19 adjusts the level of the original sound recording to between 0 and −17 db with a level of about −5 db being preferred while adjuster 20 adjusts the level of the recording of the translation to about 0 db. Level adjusters 19 and 20 may comprise conventional studio equipment which once set to a desired level automatically adjusts the audio to this level.

The outputs of level adjustment devices 19 and 20 are fed to summer 22 where they are combined and fed to compressor 24 which may comprise a commercially available compressor such as model DBX 166 manufactured by DBX, Inc. The output of player 15 which is a second recording of the translation advanced in time relative to the first by a time "t" 0.5-2.0 seconds(preferably about 0.5 secs) is used as an attack signal to trigger compressor 24 so that the combined audio track is suppressed 0.5-2 seconds before the start of each translation signal, the suppression being such as to bring the level of the audio down from a level, "b" as indicated in the FIGURE which is above 0 db to a level "a" which can be as low as −20 db. In the preferred embodiment, the suppression is about 0.5 seconds before the start of each translation and the level "a" is about −5 db. In a time "t" 0.5-2 seconds after the translation audio stops, the audio is restored to its previous level. The output of compressor 24 is fed to recorder 25 to provide the new sound track including the original and the translation for the video or film production.

While the invention has been described and illustrated in detail, it is to be clearly understood that this is intended by way of illustration and example only and is not to be taken by way of limitation, the scope of the invention being limited only by the terms of the following claims:

I claim:

1. A system for recording the original sound track for a video or film production along with a translation of the original sound track into a different language therefrom while leaving the audio of both the original sound track and the translation at a predetermined audio level which is within the normal hearing range at all times comprising:

first playback means for providing an audio output in accordance with the original sound track, second playback means for providing an audio output in accordance with the translation of said original sound track, means for time shifting the output of said second playback means relative to that of said first playback means for optimum clarity and comprehension, means for adjusting the audio level of the output of said first playback means to a predesired level which is within the normal hearing range, means for adjusting the audio level of the output of said second playback means to a predesired level which is within the normal hearing range and above the audio level of the output of said first playback means, third playback means for providing an output in accordance with said translation which is advanced in time relative to the output of said second playback means by a predetermined time period, means for combining the outputs of said first and second playback means, means responsive to the output of said third playback means for lowering the level of the output of said combining means during a period of time encompassing said predetermined time period before the appearance of a signal in the output of said second playback means, during the presence of said signal in the output of said second playback means, and a predetermined time period after said signal in the output of said second playback means has terminated, said lowered level being within the normal hearing range, and means for recording the output of said means for lowering the output of the combining means.

2. The system of claim 1 wherein said means for lowering the level of the output of said combining means comprises an audio compressor.

3. The system of claim 1 wherein the predetermined time periods before and after the output of the second playback means is present are each 0.5-2 seconds.

4. The system of claim 1 wherein the predetermined time periods before and after the output of the second playback means is present are each about 0.5 seconds.

5. The system of claim 1 wherein the predesired level to which the audio level of the output of said first playback means is adjusted to about −5 db and the predesired level to which the audio level of said second playback means is adjusted is about 0 db.

6. A method for combining an original sound track video or film sound track with a translation thereof on a common recording medium in a manner so that both sound tracks are audible and can be understood by a listener comprising the steps of:

recording the original sound track and a synchronized translation thereof on separate similar recording devices, time shifting the recordation of the translation relative to the original sound track for optimum clarity and comprehension, separately adjusting the levels of the recordation of the original sound track and the recordation of the translation thereof so that both levels are within the normal hearing range and the level of the recordation of the original is substantially lower than that of the translation, combining the level adjusted recordations of the original and translation, lowering the level of the combined recordation to a level within normal hearing range during a period of time encompassing a short time before each appearance of the translation, during the presence of the translation, and a short time after the end of the translation, and recording the combined recordation signal on said common recording medium.

7. The method of claim 6 wherein the level of the recordation of the original sound track is adjusted to about −5 db and the level of the recordation of the translation to about 0 db.

8. The method of claim 6 wherein the short periods of time before each appearance of the translation and after the end of each translation are each 0.5-2 seconds.

* * * * *